United States Patent
Roemen

(10) Patent No.: US 12,552,599 B2
(45) Date of Patent: Feb. 17, 2026

(54) MODULAR PARTICULATE STORAGE SYSTEM

(71) Applicant: WET SAND SOLUTIONS, LLC, Brookshire, TX (US)

(72) Inventor: Jacob Michael Roemen, Brookshire, TX (US)

(73) Assignee: WET SAND SOLUTIONS, LLC, Brookshire, TX (US)

( * ) Notice: Subject to any disclaimer, the term of this patent is extended or adjusted under 35 U.S.C. 154(b) by 456 days.

(21) Appl. No.: 18/207,266

(22) Filed: Jun. 8, 2023

(65) Prior Publication Data

US 2024/0409305 A1    Dec. 12, 2024

(51) Int. Cl.
| | |
|---|---|
| B65D 88/00 | (2006.01) |
| B62D 33/02 | (2006.01) |
| B65D 88/54 | (2006.01) |
| B65G 3/04 | (2006.01) |
| B60P 3/00 | (2006.01) |
| B62D 63/08 | (2006.01) |

(52) U.S. Cl.
CPC ........... B65D 88/005 (2013.01); B62D 33/02 (2013.01); B65D 88/542 (2013.01); B65G 3/04 (2013.01); *B60P 3/00* (2013.01); *B62D 63/08* (2013.01); *B65G 2207/30* (2013.01)

(58) Field of Classification Search
CPC ....... B65D 88/005; B65D 88/022; B65G 3/04
See application file for complete search history.

(56) References Cited

U.S. PATENT DOCUMENTS

| | | | | |
|---|---|---|---|---|
| 4,331,252 | A * | 5/1982 | Carren | B65D 88/10 |
| | | | | 220/668 |
| 7,690,522 | B2 * | 4/2010 | Rood | B65D 88/123 |
| | | | | 220/1.5 |
| 10,766,709 | B2 * | 9/2020 | Smith | B65D 88/022 |
| 11,130,625 | B2 * | 9/2021 | Ledoux | B65D 88/027 |
| 11,597,590 | B2 * | 3/2023 | Austrheim | B65D 90/0073 |
| 2016/0229626 | A1 * | 8/2016 | Claeys | B65D 88/005 |

* cited by examiner

*Primary Examiner* — Jonathan Snelting
(74) *Attorney, Agent, or Firm* — Jeffrey L. Streets

(57) ABSTRACT

A modular particulate storage system includes a plurality of portable skids, wherein each skid includes an elongate rectangular base supporting a floor section and a wall section extending upward from the floor section. The plurality of portable skids are securable together in a side-by-side configuration to form a storage bay having a contiguous rectangular floor that combines the floor sections of the plurality of portable skids and a contiguous wall that combines the walls sections of the plurality of portion skids and extends along three sides of the contiguous rectangular floor. One side of the contiguous rectangular floor includes an open passageway into the storage bay. A skid may be formed as a trailer that may be lowered to be supported by the ground.

20 Claims, 11 Drawing Sheets

MODULAR PARTICULATE STORAGE SYSTEM

BACKGROUND

The present disclosure relates to methods and apparatus for storing and handling particulate material at a work site, such as the storage of sand at a well site.

BACKGROUND OF THE RELATED ART

Particulate materials, such as sand and small rocks, are used in a variety of work sites, such as construction sites and well sites. In some applications, the particulate materials may be dumped on the ground for storage prior to use. However, for other applications, such as hydraulic fracturing of a subterranean formation containing oil or gas, contamination of the sand must be avoided, and any sand spilled onto the ground must be remediated when the well has been completed.

BRIEF SUMMARY

Some embodiments provide a modular particulate storage system comprising a plurality of portable skids, wherein each skid includes an elongate rectangular base supporting a floor section and a wall section extending upward from the floor section. The plurality of portable skids are securable together in a side-by-side configuration to form a storage bay having a contiguous rectangular floor that combines the floor sections of the plurality of portable skids and a contiguous wall that combines the walls sections of the plurality of portion skids and extends along three sides of the contiguous rectangular floor. One side of the contiguous rectangular floor includes an open passageway into the storage bay.

Some embodiments provide a method comprising positioning a plurality of portable skids in a side-by-side configuration, wherein each portable skid includes an elongate rectangular base supporting a floor section and a wall section extending upward from the floor section. The method further comprises securing, for each of the portable skids, the portable skid to one or more of the portable skids that are immediately adjacent to the portable skid to form a storage bay. The storage bay has a contiguous rectangular floor that combines the floor sections of the plurality of portable skids and a contiguous wall that combines the wall sections of the plurality portable skids and extends along three sides of the contiguous rectangular floor. One side of the rectangular floor includes an open passageway into the storage bay.

FIGS. BA-C are diagrams of two portable skids being secured together in a side-by-side configuration.

Figure 9B:
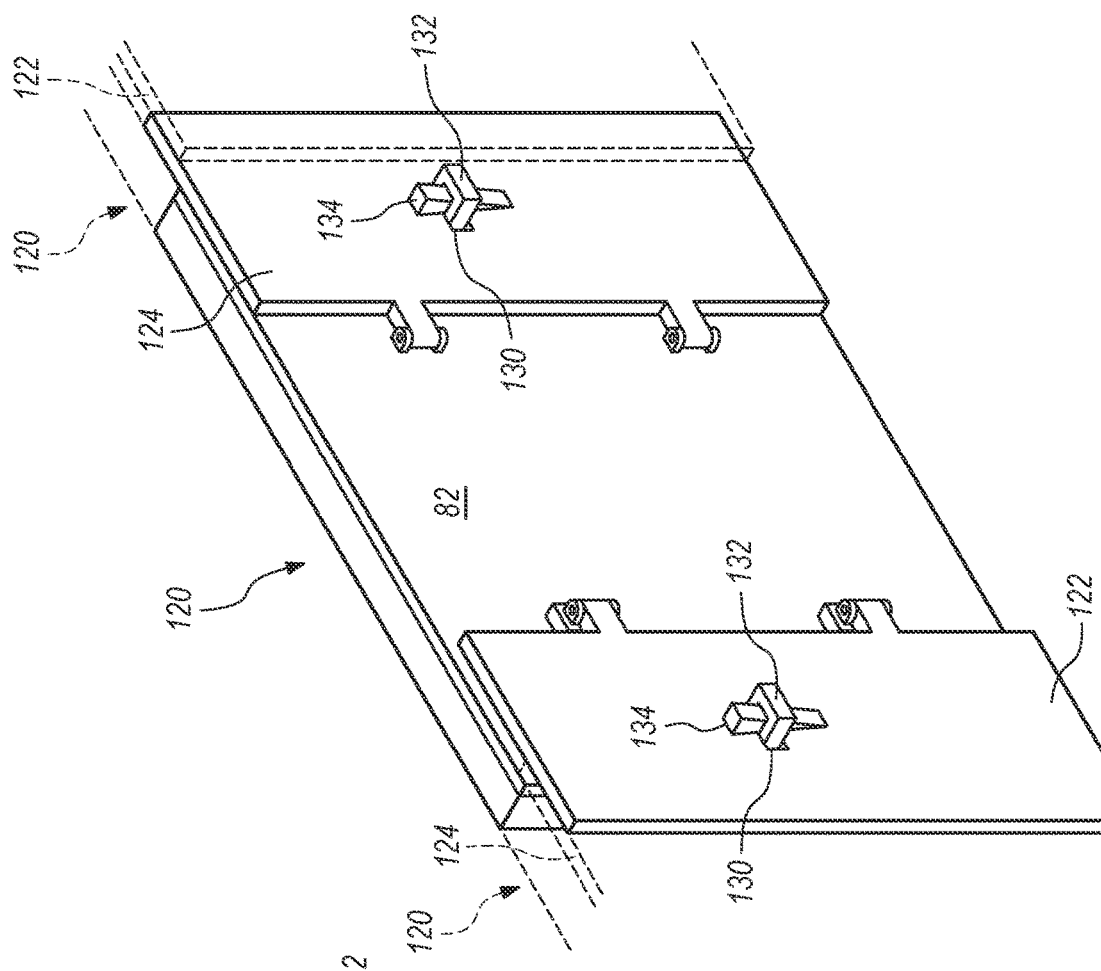
Figure 9A:
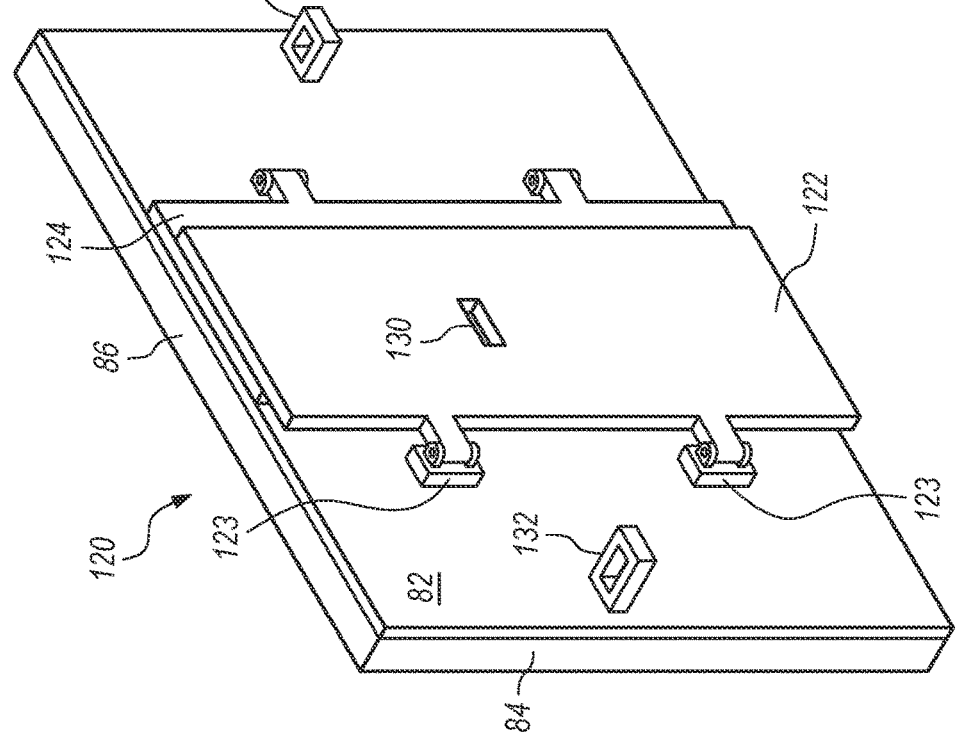

FIGS. 9A-B are perspective views of a wall section having a pair of hinged panels in stowed and deployed conditions, respectively.

DETAILED DESCRIPTION

Some embodiments provide a modular particulate storage system comprising a plurality of portable skids, wherein each skid includes an elongate rectangular base supporting a floor section and a wall section extending upward from the floor section. The plurality of portable skids are securable together in a side-by-side configuration to form a storage bay having a contiguous rectangular floor that combines the floor sections of the plurality of portable skids and a contiguous wall that combines the walls sections of the plurality of portion skids and extends along three sides of the contiguous rectangular floor. One side of the contiguous rectangular floor includes an open passageway into the storage bay.

The portable skid is a structure that facilitates transportation of prefabricated equipment or components. The skid may be permanently connected to the equipment and may form some aspect of the equipment. In addition, the skid preferably has a base that is flat or will be stable resting on a flat load bearing surface, such as a load bearing stratum, ground, gravel, concrete or other bedding material forming a flat foundation for the skid.

The storage bay is a structure that is beneficial for the storage and retrieval of particulate material, such as sand, gravel, grain. Since embodiments of the modular particulate storage system may be used to form a storage bay using multiple portable skids, the storage bay may be used in remote locations or work sites, such as a construction site or well site. In particular, the storage bay may be beneficially used to store a proppant at a well site where a hydraulic fracturing operation is to be performed. A proppant is a solid material that is designed to keep an induced hydraulic fracture open during or following a fracturing treatment. In some hydraulic fracturing operations, the proppant may be treated or untreated sand, ceramics, sintered bauxite, and other less common materials. The size and composition of the proppant is preferably tightly controlled, and the storage bay may be used to prevent contamination of the proppant. In some implementations, the module particulate storage system may be referred to as a "dance floor."

Embodiments of the storage bay have a contiguous rectangular floor that combines the floor sections of the plurality of portable skids and a contiguous wall that combines the walls sections of the plurality of portion skids and extends along three sides of the contiguous rectangular floor. The term "contiguous" means that the components forming the structure are touching or connected in an unbroken sequence. For example, the portable skids may be secured in a side-by-side configuration with the long sides of the skids touching and connected one skid to the next skid across the plurality skids. Accordingly, the floor sections of those skids will be touching and connected to form the contiguous rectangular floor. Similarly, with the portable skids in the side-by-side configuration with the long sides of the skids touching and connected one skid to the next skid across the plurality skids, the wall sections of those skids will be, or may be caused to be, touching and connected to form the contiguous wall.

Embodiments of the wall may extend along three sides of the contiguous rectangular floor, but one side of the contiguous rectangular floor includes an open passageway into the storage bay. While the wall may extend along the full length of all three sides, the wall may also be constructed to stop short of the full length on the left and/or right sides near the open passageway. However, any reduction in the length of the walls on the left and/or right sides of the storage bay may reduce the total storage capacity of the storage bay. The open passageway may be formed along the fourth side of the contiguous rectangular floor, most preferably extending the full length of fourth side, and allows equipment to access particulate material stored within the storage bay. An equipment ramp is securable to one side of a portable skid that borders the fourth side having the open passageway and is preferably coextensive with the open passageway. For example, the equipment ramp may be secured to the side of a portable skid with a set of pins, bolts or other fasteners or couplings. A preferred equipment ramp slopes from a load bearing surface up to the contiguous rectangular floor and aligns with the open passageway.

Embodiments may be described with reference to the side of the storage bay having the open passageway as being the "front", the side directly opposite the front being the "back", and the sides extending between the front and back as being the "sides". Optionally, the two sides may be distinguished as first and second sides or as left and right sides. As with the reference to "front" and "back", the "left" and "right" sides may be described with reference to the perspective of a front loader facing into the open front side of the storage bay. The open (front) side of the storage bay is preferably formed by one side of a first portable skid in the side-by-side configuration and the back side of the storage bay is preferably formed by a last portable skid in the side-by-side configuration.

In some embodiments, the plurality of portable skids may include one portable skid with a longitudinal wall section that will form a back wall of the storage bay and a plurality of portable skids each having a first wall section that will form a part of a left side wall of the storage bay and a second wall section that will form a part of a right side wall of the storage bay. In one option, the portable skid having the longitudinal wall section may also include a partial left and right side wall sections. The left and right side wall sections preferably form a right angle (a 90 degree angle) with the longitudinal wall section.

In some embodiments, the portable skids may be formed into a trailer having a first end with a set of wheels, a second end having a trailer coupler, and a central portion between the first and second ends that forms one of the floor sections of the contiguous rectangular floor. In one example, each trailer may be a winch trailer having a trailer frame designed to be set on the ground. In another example, each trailer may have retractable axles or a retractable axle assembly that allows the trailer frame to rest on the ground.

In some embodiments, the bases of any two adjacent portable skids may be pinned together with a rigid bar or shaft that mounts through a first mounting lug (also referred to as a "cateye bracket") secured to a first portable skid and a second mounting lug secured to a second portable skid. The mounting lugs may each be welded to the outside edges of the rectangular base, such as a longitudinal skid frame, at the front and back ends of the skid for a total of four mounting lugs per skid. After the portable skids have been positioned in the side-by-side configuration, the mounting lugs of adjacent skids may be aligned and a rigid bar or shaft may be installed through the pair of mounting lugs to help keep the two adjacent sides of the skids at the same elevation. In one example, the rigid bar may be a cylindrical shaft, most preferably with a diameter of about 4 inches. Extending the rigid bar through the holes in the adjacent and aligned mounting lugs will keep the edges of the two adjacent skids at the same vertical elevation. Accordingly, the contiguous rectangular floor may have a relatively continuous surface with no sudden steps up or down in elevation from the floor section of one skid to the floor section of the next skid. While the rigid bar and mounting lugs may be used to maintain vertical alignment of the adjacent portable skids, racketing chain binders may be used to prevent lateral movement (i.e., separation) of the skids.

Each wall section may be formed by a rigid plate secured to a rigid wall frame, where the rigid plate forms a front surface and the rigid wall frame is secured to a back surface of the rigid plate. For example, the rigid plate may be plate steel and the rigid wall frame may be formed by vertical and horizontal support members made with rectangular steel tubing. The plate steel is preferrable welded to the rectangular steel tubing. Without limitation, the plate steel may have a thickness of about 0.5 inches and the rectangular tubing may be about 4 inch square tubing. In one option, the rigid wall frame may have vertical support members that are laterally spaced apart every 1 to 2 feet, most preferably laterally spaced apart every 19½ inches, and may have horizontal support members that are vertically spaced apart every 2-3 feet, most preferably vertically spaced apart every 30½ inches.

Some embodiments may include braces to support each wall from the back side of the wall. The braces secure the wall to the trailer and position the wall in an upright or vertical orientation. However, the braces preferable provide the wall with enough strength and/or rigidity to withstand the forces of a large pile of particulate material, such as sand, and the forces of heavy equipment, such as a front loader, that may push the pile of particulate material against the wall during loading. In one option, the braces may be formed by a structural steel framework forming a triangular brace, perhaps forming a 45-60 degree angle from the plane of the dance floor. Each brace will preferably extend laterally from the back side of the wall section at nearly a right angle (about 90 degrees) to the wall section. Without limitation the braces may be welded (permanently connected) or bolted (temporarily connected) to the rigid wall frame, perhaps at the intersections of vertical support members and horizontal support members. In one preferred configuration, the braces may be secured to the back of the wall sections with a lateral spacing of about 37 inches and may be connected to a mounting plate. In one example, the mounting plate may be a square plate having sides about 8 inches long. In some embodiments, a plurality of wall braces may support each wall section, wherein each wall section is formed by a rigid panel and a rigid wall framework secured to an outwardly directed side of the rigid panel. Each wall brace may be connected to both the rectangular base of a particular skid and the rigid wall framework of a particulate wall section. Furthermore, long and short wall sections may be constructed in a similar manner with similar spacing of braces.

Each skid may be configured so that its frame may be set on a load bearing surface, such as the ground or other suitable bedding. Preferably, a location for assembly of the storage bay may be leveled and then prepared with a layer of gravel spread over the leveled ground. Other means for stabilizing the ground may also be utilized. A truck, sometimes referred to as a tractor, may drive onto the load bearing surface to position an individual skid in a designated position for inclusion forming the storage bay. Where the skid forms a trailer, a preferred truck may be equipped with a "fifth wheel" coupling to selectively link to a kingpin on the bottom side of the trailer. Once the trailer is in position, the truck may disengage from the trailer and the trailer may be lowered to rest on the load bearing surface. In one example, the trailer may be a winch trailer and the trailer may be lower by letting out cable from a truck-mounted winch. In another example, an axle assembly and trailer landing gear may be retracted upward relative to the central trailer frame until the trailer frame rests on the load bearing surface. Hydraulic cylinders may be used to lift and lower the axle assembly and trailer landing gear relative to the trailer frame, with the axle assembly being lowered (i.e., the central trailer frame lifted) into place for transport mode and being lifted (i.e., the central trailer frame lowered) so that the trailer frame rests on the load bearing surface for an operational mode. Once the axle assembly is lowered into place for the transport mode, an I-beam on the axle assembly may be pinned or bolted to the main trailer frame to add stability and strength during transportation.

The base or frames of adjacent skids may be secured together to form the storage bay. In one example, each pair of adjacent skids may be connected together at along a front end of the skids and along a back end of the skids. The connections are intended to keep the adjacent pair of skids on the same grade or level and also to prevent the trailers from shifting apart. In one example, each portable skid may include a front mounting lug for facing an adjacent portable skid and a back mounting lug for facing the adjacent portable skid, wherein each mounting lug includes a laterally directed hole therein. With the mounting lug holes aligned, a shaft may be extended through the hole in the front mounting lug of a first skid and also through the hole in the front mounting lug of a second skid that is positioned adjacent the first skid. Placing the shaft through the two mounting lugs keeps the floor section of the first skid at the same elevation as the floor section of the second skid. In another example, each portable skid may be equipped with a ring, such as a standard "D" ring, at the front and back ends of the skid, such that a first chain binder may be used to pull the front rings of the two skids together and a second chain binder may be used to pull the back rings of the two skids together. Optionally, a front loader, forklift or other heavy equipment may be used to push the two adjacent skids together as the chain binders take up any slack in the chain between the rings. One example of a suitable forklift may have a 10,000 pound rated capacity. In some embodiments, the modular system may include a plurality of ratcheting chain binders, wherein each ratcheting chain binder has a first end securable to a first ring on the rectangular base of a first portable skid and a second end securable to a second ring on the rectangular base of a second portable skid that is adjacent to the first portable skid. With the first and second ends of the ratcheting chain binder secured in this manner, the ratcheting chain binder may be tightened to prevent lateral separation of the rectangular bases of the first and second portable skids.

In some embodiments, the wall sections of adjacent trailers may also be secured together. In one option, a ratcheting chain binder (also referred to as a ratchet type load binder) may be used to secure two adjacent wall sections together. For example, the back side (i.e., an outwardly directed side) of two adjacent wall sections may be fastened together. Where each wall section is equipped with a ring, two ends of the ratcheting chain binder may be connected to the two rings and then operated to bias the edges of the wall sections together. The ratcheting chain binder may move the wall sections closer together (i.e., narrowing a gap therebetween) or may oppose forces that might cause the wall sections to separate (i.e., keep a gap from forming or widening). In some embodiments, the system may include a plurality of ratcheting chain binders, wherein each ratcheting chain binder has a first end securable to a first ring attached to a wall section of a first portable skid and a second end securable to a second ring attached to a wall section of a second portable skid that is adjacent to the first portable skid. The ratcheting chain binder may be tightened to prevent lateral separation of the wall sections of the first and second portable skids.

In some embodiments, each wall section may include one or two hinged or detachable panels (also referred to as "doors") that can be extended beyond the edge of the wall section bed to overlap with adjacent wall section and/or hinged or detachable panel of an adjacent skid. Accordingly, the panel or panels may block any gap that might exist between the wall sections of the adjacent skids and thereby prevent or minimize any of the particulate material from escaping between the adjacent wall sections. In some embodiments, each wall section may include a hinged panel mounted on an inward facing surface of the wall section, wherein the hinged panel may be placed in a stowed condition for transportation and placed in a deployed condition for containing particulate material in the storage bay. The hinged panel may extend beyond an edge of the wall section in the deployed condition but not in the stowed condition. Optionally, the hinged panel may be secured in either the stowed or deployed condition with a latch, which may include use of a wedge pin.

For embodiments having a wall section with two hinged panels, the hinges for a first panel may be secured directly to the wall section so that the first panel may lay in a plane close against the wall section and the hinges for a second panel may be offset or shimmed a short distance from the wall section so that the second panel may lay in a plane offset from the wall section. The second panel will preferably lay in a plane close to the first panel so that the first and second panels will overlap and lay flat against each other and the wall section. For example, the thickness of the shim disposed between the wall section and the hinges for the second panel may be about the same thickness as the first panel such that, when the first and second panels are folded toward each other, the first panel lays flat against the wall section and the second panel lays flat against the first panel. The first and second panels may be folded toward each other in a storage or transport position.

In some embodiments, each wall section may have a latch mechanism for each panel, where the latch mechanism may be used to secure the panel in a deployed position (i.e., no longer in the storage or transport position). In one non-limiting example, the latch mechanism may include a slotted pin member welded to the trailer wall section that is positioned to align with a slot in one of the panels. When the panel is placed in the deployed position, the panel closes over the slotted pin member such that the pin member is received in and extends through the slot in the panel. The portion of the slotted pin member that extends through the panel slot may receive a wedge-shaped retaining pin. The narrow end of the wedge-shaped retaining pin is directed downward through the slot in the pin such that the retaining pin prevents the panel from opening (i.e., moving in a direction away from the wall section).

The skids may have opposing lateral side edges that are substantially linear and parallel and define a maximum lateral width of the skid. Components and structure of the skid will preferably not extend beyond these lateral side edges in a manner that would obstruct or prevent the skid from being positioned in a close side-by-side position with other instances or units of the skid. The instances of the trailers should be able to be positioned as close together as possible, with any gap being minimal and allowing no more than a minor amount of the particulate material to enter any such gap.

The modular particulate storage system forms a storage bay for bulk storage of a particulate material, such as wet or dry sand. The storage bay may have a rectangular storage area with a depth (from the open front to the back wall), and a width (between the left side wall and the right side wall), and a height (from the contiguous rectangular floor to the top of the walls). The plurality of skids may include any number of the skids so that, with each of the skids positioned in the side-by-side configuration, the total depth of the storage bay may be varied to obtain a desired capacity for storage of the particulate material. In one option, the number of skids may be such that the total depth of the storage area is similar to the width of the storage area. In another option, the storage bay may have the capacity to store enough sand for one hydraulic fracturing stage. Furthermore, the particulate storage capacity may be easily modified by simply adding or subtracting one or more skids to or from the module particulate storage system to cause a corresponding change in the storage capacity of the storage bay.

The walls of the storage bay provide the benefit of allowing a greater amount of the particulate material to be stored in a limited area. Specifically, a pile of the particulate material may rise up to the height of the walls without spreading out beyond the dimensions of the storage bay. The pile of particulate material may still spread toward the walls and the open side of the storage bay according to the angle of repose for the specific particulate material. The walls of the storage bay provide a further benefit of facilitating scooping up the particulate material with a front loader or similar heavy equipment since the particulate material can be pressed up against the wall (rather than pushing the pile across the ground). Yet another benefit of the storage bay is that the particulate material is contained to reduce or eliminate losses of the particulate material and to avoid contamination of the particulate material with soil or organic material that can occur by piling the particulate material directly on the ground. The wall sections preferably have a height between 4 and 12 feet.

Some embodiments provide a method comprising positioning a plurality of portable skids in a side-by-side configuration, wherein each portable skid includes an elongate rectangular base supporting a floor section and a wall section extending upward from the floor section. The method further comprises securing, for each of the portable skids, the portable skid to one or more of the portable skids that are immediately adjacent to the portable skid to form a storage bay. The storage bay has a contiguous rectangular floor that combines the floor sections of the plurality of portable skids and a contiguous wall that combines the wall sections of the plurality portable skids and extends along three sides of the contiguous rectangular floor. One side of the rectangular floor includes an open passageway into the storage bay.

In some embodiments of the method, each portable skid may form a trailer having a first end with a set of wheels, a second end having a trailer coupler, and a central portion between the first and second ends that forms one of the floor sections of the contiguous rectangular floor. the method may further include lowering each of the trailers to be supported by a load bearing surface in the side-by-side configuration.

Some embodiments of the method may further include securing an equipment ramp to one of the portable skids, wherein the equipment ramp slopes from a load bearing surface up to the contiguous rectangular floor and aligns with the open passageway.

Some embodiments of the method may further include binding, for each of the trailers, the wall section of the trailer to the wall section of one or more of the trailers that are adjacent to the trailer.

Some embodiments of the method may further include storing a pile of particulate material in the storage bay, wherein the storage bay prevents the particulate material from making contact with a load bearing surface under the plurality of portable skids. Still further, the method may include driving equipment through the open passageway onto the contiguous rectangular floor to scoop up a portion of the particulate material and remove the portion of the particulate material from the pile.

Embodiments of the method may include the use of any of the embodiments of module particulate storage system, such as the transportation of the system to a work site and the assembly and usage of the storage bay at the work site.

Figure 1A:
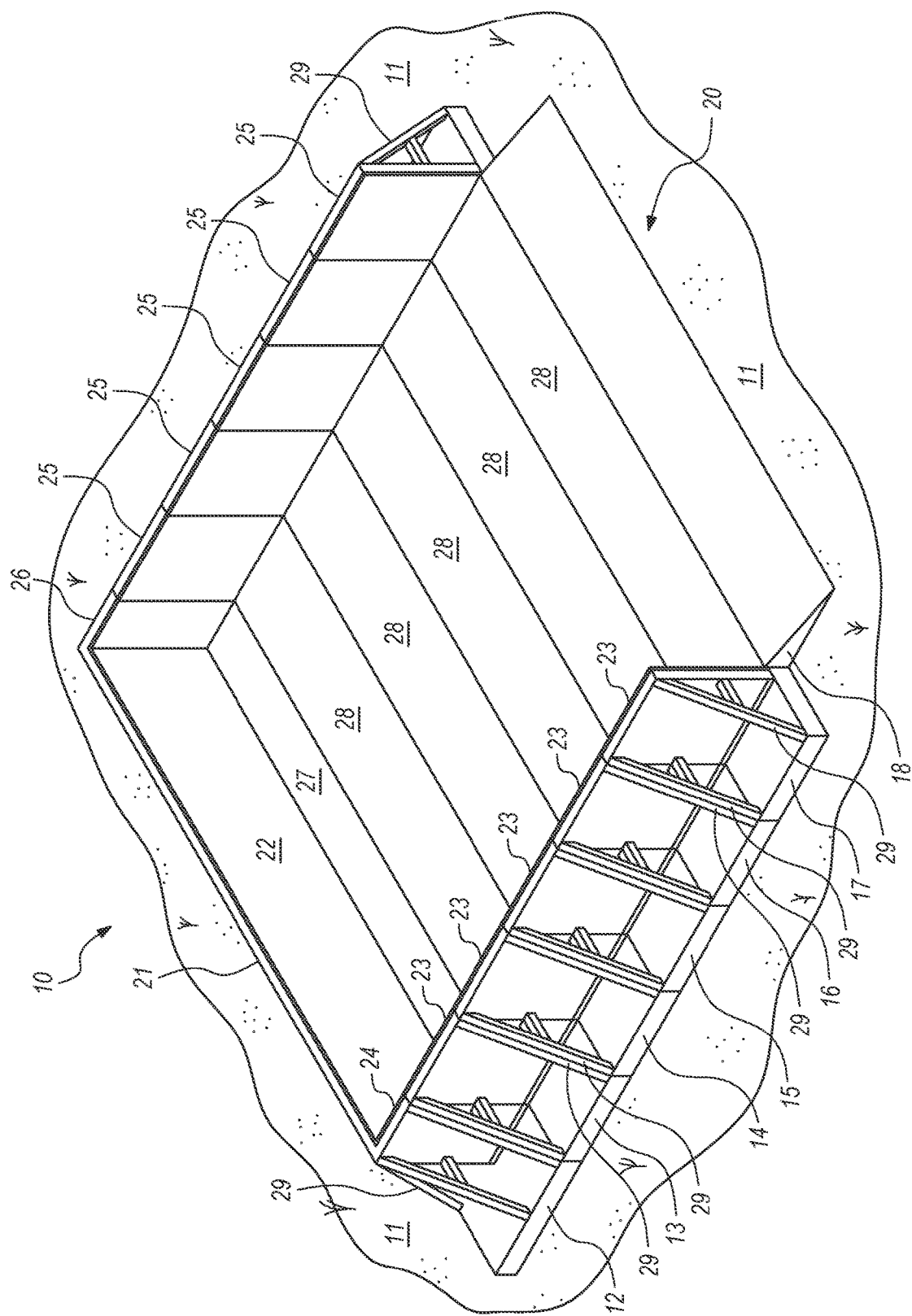
FIG. 1A is a perspective view of a storage bay formed by a plurality of portable skids.

FIG. 1A is a perspective view of a modular particulate storage system 10 that has been assembled to form a storage bay 20. The system 10 includes a plurality of portable skids 12, 13, 14, 15, 16, 17 (6 skids shown) and an equipment ramp 18. The portable skids 12-17 are positioned in a side-by-side configuration supported on a load bearing substrate 11. The long sides of the skids are in contact, one skid to the next skid across the side-by-side configuration. Furthermore, the ends of each skid may be aligned as shown.

The system 10 includes a first portable skid 12 with a longitudinal wall section 21 that will form a back wall 22 of the storage bay 20 and a plurality of portable skids 13-17 that each have a first wall section 23 that will form a part of a left side wall of the storage bay 20 and a second wall section 25 that will form a part of a right side wall of the storage bay. In the illustrated embodiment, the first portable skid 12 having the longitudinal wall section 21 also includes a partial (smaller) left wall section 24 and a partial (smaller) right side wall section 26. The left and right side wall sections 24, 26 form a right angle (a 90 degree angle) with the longitudinal wall section 22.

The first portable skid 12 may further include a floor section 27 and each of the other portable skids 13-17 include a floor section 28. With the storage bay 20 assembled as shown, the partial (smaller) floor section 27 and the floor sections 28 (5 shown) are touching and connected to collectively form a contiguous rectangular floor. Furthermore, the smaller left wall section 24 and the other left wall sections 23 are touching and connected to collectively form a contiguous left side wall. Similarly, the smaller right wall section 26 and the other right wall sections 25 are touching and connected to collectively form a contiguous right side wall.

A detailed description of the construction of the walls sections 21, 23, 24, 25, 26 will be provided in reference to other Figures. However, each wall section 21, 23, 24, 25, 26 receives physical support, strength and stability from multiple braces 29. Not all braces 29 can be seen in FIG. 1A and not all braces are labeled with a reference number.

Figure 1B:
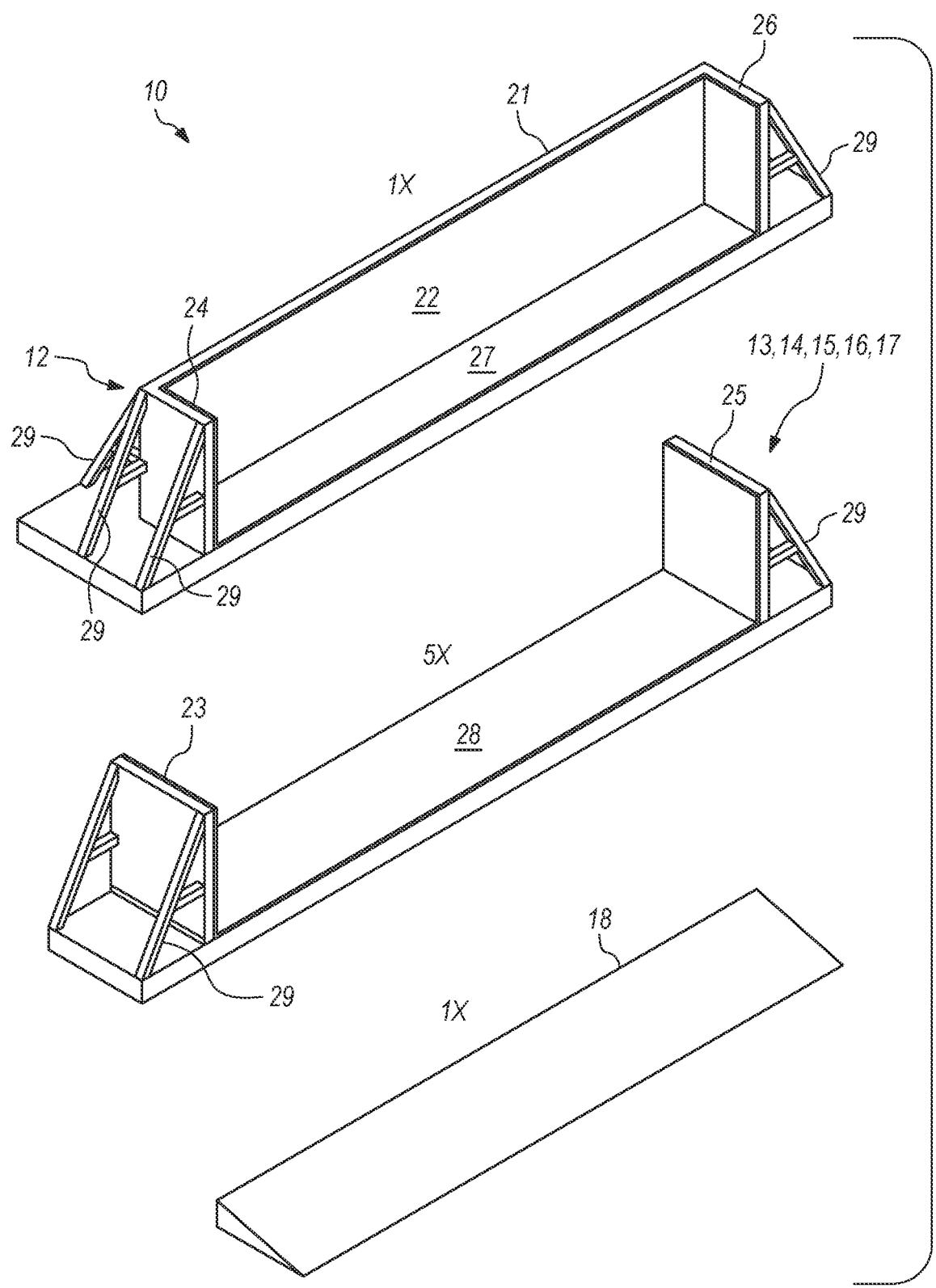
FIG. 1B is a diagram identifying the plurality of portable skids and the ramp used to form the storage bay of FIG. 1A.

FIG. 1B is a diagram identifying the major components of the modular particulate storage system 10. The system 10 (or kit of components) that was used to form the storage bay 20 of FIG. 1A includes one ("1×") portable skid 12 of a first type with a back wall 22, five ("5×") portable skids 13-17 of a second type having a left wall section 23 and a right wall section 25, and one ("1×") equipment ramp 18. Other connection equipment, connection features and other components may be included in the system 10 (or kit of components) as may be described elsewhere herein.

Figure 2A:
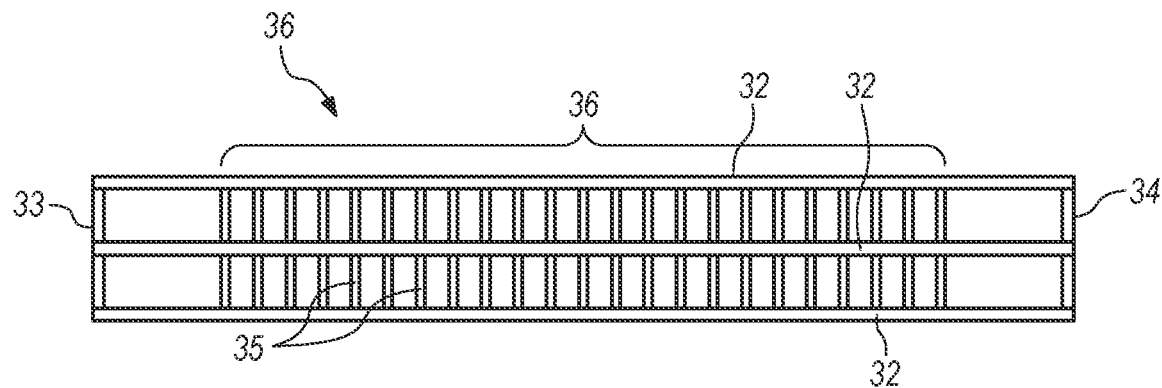
FIGS. 2A-C include a top view of a rectangular base of a portable skid, a side view of a portable skid having a back wall section, and a side view of a portable skid having left and right side wall sections.

FIG. 2A is a top view of a rectangular base 30 of a portable skid. The rectangular base 30 is a structural framework for the skid, providing strength and rigidity as well as a foundation that can both rest on the load bearing surface and support the other components of the portable skid. In this non-limiting example, the rectangular base 30 includes three longitudinal beams or frame members 32 that are connected by a first lateral beam or strut 33 at a distal end, a second lateral beam or strut 34 at a proximal end, and a plurality of lateral beams or struts 35 in a central portion 36 of the rectangular base 30. The tighter spacing of the beams 35 in the central portion 36 may be desirable to provide the strength and rigidity to support a pile of particulate material and/or the heavy equipment that may traverse the contiguous rectangular floor of the storage bay.

Figure 2B:
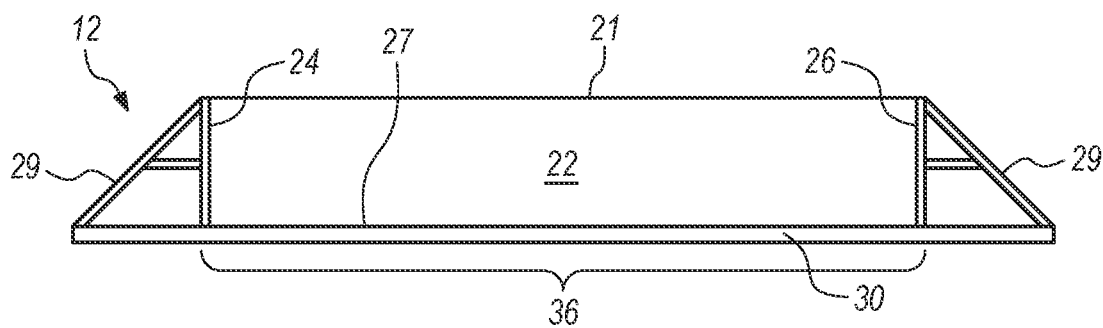

FIG. 2B is a side view of the portable skid 12 having the back wall section 22. This skid 12 is built upon the rectangular base 30 with the floor section 27 formed over the central portion 36 (see FIG. 12A) of the rectangular base. The wall sections 24, 26 are positioned along the edges of the central portion 36 and the braces 29 are connected to the rectangular base 30 beyond the base.

Figure 2C:
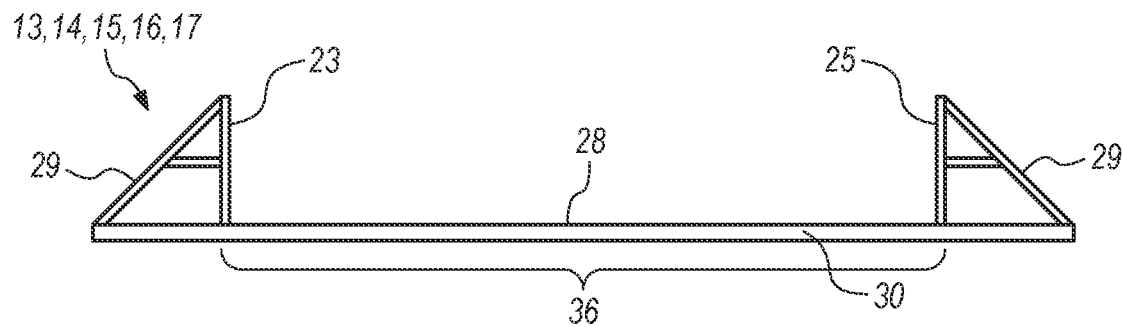

FIG. 2C is a side view of one or the portable skids 13-17 having left and right side wall sections 23, 25. These skids are also built upon an instance of the rectangular base 30 with the floor section 28 formed over the central portion 36 (see FIG. 12A) of the rectangular base. The wall sections 23, 25 are positioned along the edges of the central portion 36 and the braces 29 are connected to the rectangular base 30 beyond the base. However, there is no back wall extending longitudinally between the wall sections 23, 25 and the wall sections 23, 25 may be the same width as the width of the rectangular base 30.

Figure 3A:
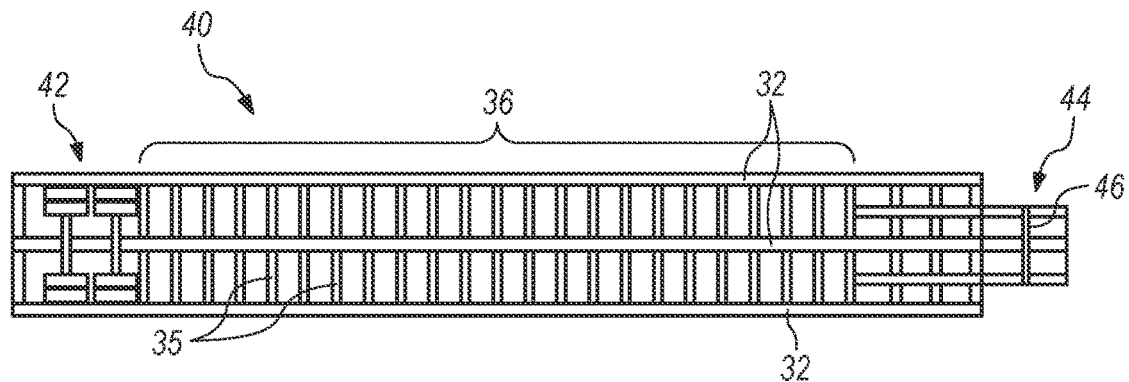
FIGS. 3A-C include a top view of a rectangular base of a trailer, a side view of a trailer having a back wall section, and a side view of a trailer having left and right side wall sections.
Figure 3B:
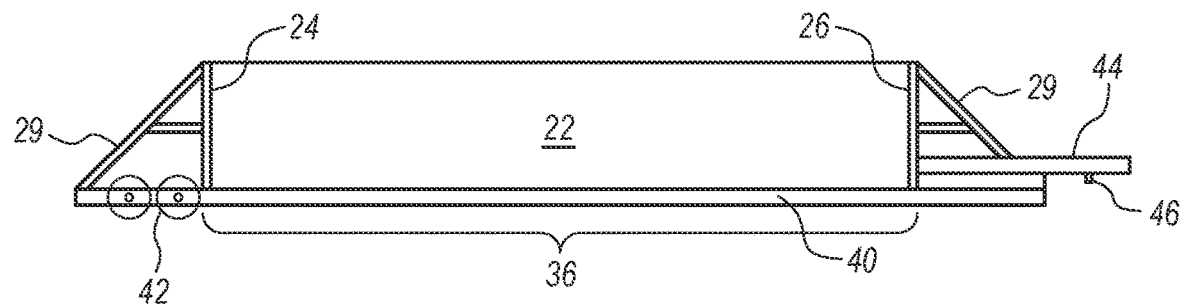
Figure 3C:
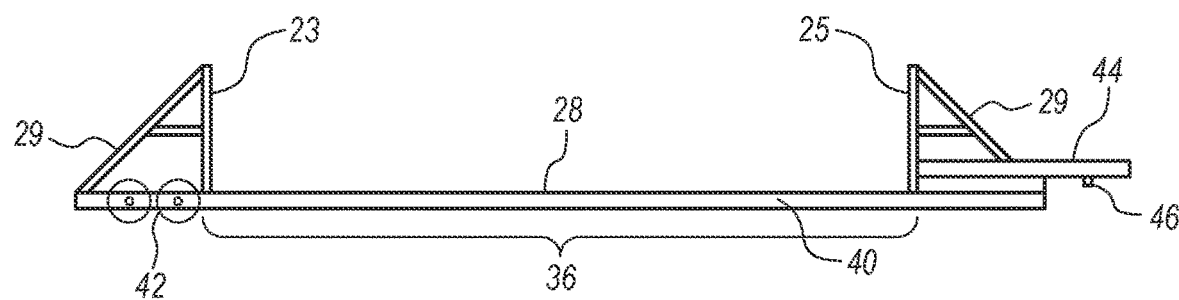

FIGS. 3A-C include a top view of a rectangular base 40 of a trailer (FIG. 3A), a side view of a trailer having a back wall section (FIG. 3B), and a side view of a trailer having left and right side wall sections (FIG. 3C). FIGS. 3A-C are similar to FIGS. 2A-C except that the rectangular base 40 in FIGS. 3A-C has been modified to form a trailer including a wheel assembly 42 at the rear of the trailer and a tongue 44 at the front end of the trailer. However, the basic structure of the trailer may still function as a portable skid. FIGS. 3B-C show the position of a coupler 46 secured to the tongue 44.

Figure 4A:
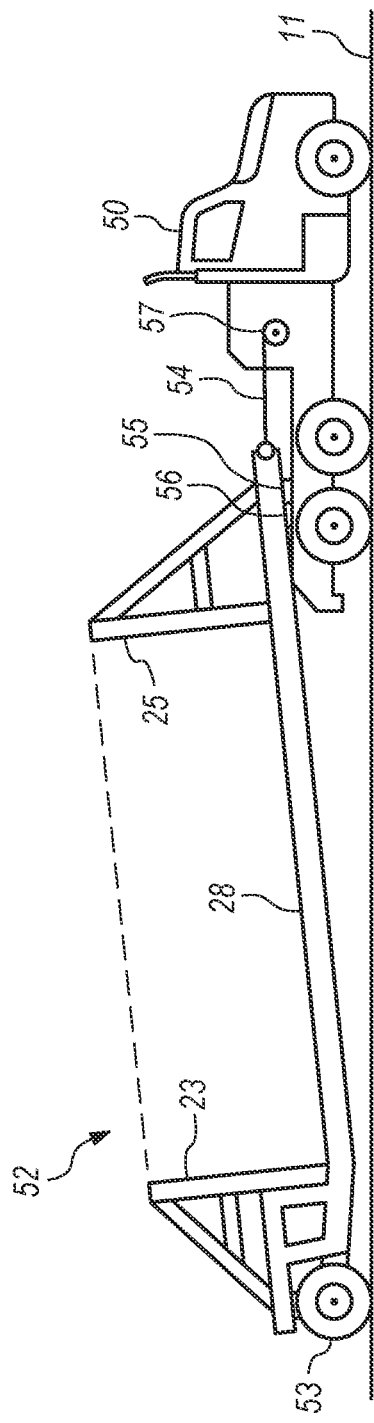
FIGS. 4A-B are side views of a winch truck handling a winch trailer having left and right side wall sections during transport, positioning and lowering onto a load bearing surface.
Figure 4B:
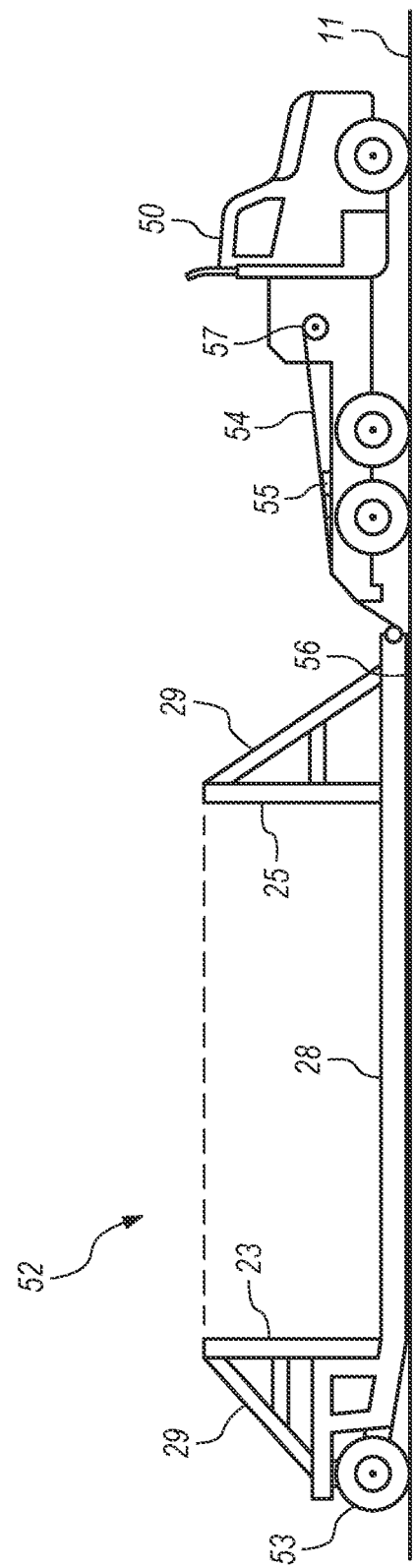

FIGS. 4A-B are side views of a winch truck 50 handling a winch trailer 52 having left and right side wall sections 23, 25 during transport, positioning and lowering onto a load bearing surface 11. In FIG. 4A, the winch trailer 52 is connected to the winch truck 50 by a winch cable 54 and a kingpin 56 cooperating with a fifth wheel hitch 55 that is part of the winch truck 50. A winch motor and cable reel 57 may controllably wind the cable onto the reel so that the winch trailer 52 is drawn into the connected condition shown in FIG. 4A and may controllably unwind the cable from the reel so that the winch trailer 52 may, if the kingpin 56 is released from the fifth wheel hitch 55, be lower into the operating condition shown in FIG. 4B. In FIG. 4B, the front end of the winch trailer 52 has been lowered from the winch truck 50 and the winch cable 54 may be disconnected. In the operating condition shown, the winch trailer 52 is directed supported by the load bearing surface 11 and the rear wheels 53 are lifted off the load bearing surface 11 or at least no longer support the weight of the trailer. As shown in FIG. 4B, the winch trailer 52 may perform the same functions and provide the same structure as a portable skid yet has the additional benefit of being transported and positioned as a trailer.

Figure 5A:
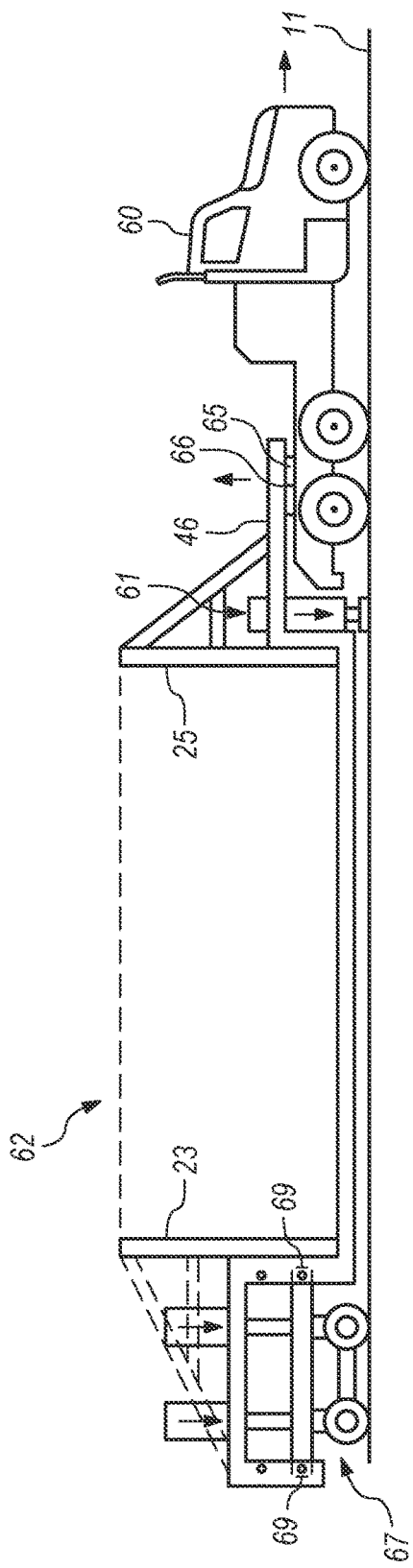
FIGS. 5A-B are side views of a truck and a semi-trailer having left and right side wall sections during transport, positioning and lowering onto a load bearing surface.
Figure 5B:
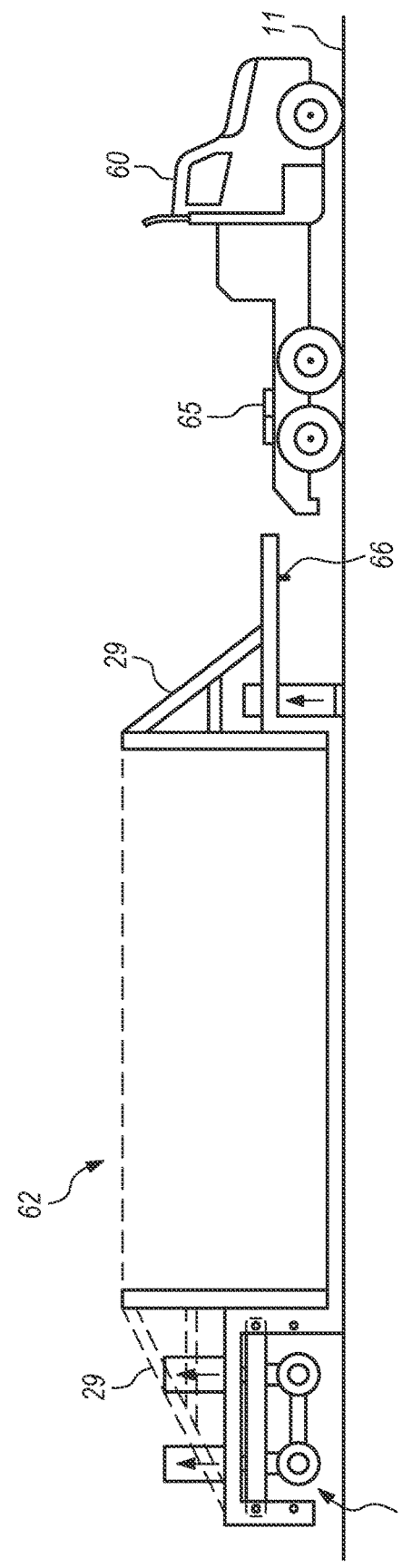

FIGS. 5A-B are side views of a truck 60 and a semi-trailer 62 having left and right side wall sections 23, 25 during transport, positioning and lowering onto the load bearing surface 11. In FIG. 5A, the semi-trailer 62 is connected to the truck 60 by a kingpin 66 cooperating with a fifth wheel hitch 65 that is part of the winch truck 60. Once the trailer 62 has been suitably positioned to be included in a side-by-side configuration for assembly into a storage bay, the trailer landing gear 61 may be extended to support the front of the trailer including the tongue 46 and allow the truck 60 to disconnect and drive out from under the tongue 46. However, after the truck 60 has been disconnected and removed, the semi-trailer 62 may be lowered until it is fully supported by the load bearing surface 11, such as a flat area of ground. To lower the semi-trailer 62, the landing gear 61 and a rear wheel assembly 67 may both be operated to retract upward to disengage the load bearing surface 11 or at least no longer support the load of the trailer. The landing gear 61 may be manually retracted, such as operating a hand crank mechanism, or retracted using a hydraulic cylinder that uses pressurized hydraulic fluid to extend the landing gear 61. Similarly, the rear wheel assembly 67 may be retracted upward (see FIG. 4B) and/or extended downward (see FIG. 4A) using one or more hydraulic cylinders. However, the rear wheel assembly 67 may be secured into the lowered position, perhaps using pins or bolts 69, to add strength and stability during transportation of the trailer 62. It should be noted that the braces 29 in FIGS. 4A-B and 5A-B are securable to the base or frame of the trailers 52, 62 despite the addition of wheel assemblies, trailer tongues, and the like. It is not necessary for each brace to have identical construction and the construction of the skid or trailer can be accommodated with variations in the brace size and/or shape. In addition, the trailers 52, 62 shown in FIGS. 4A-B and 5A-B may be configured with left and right side wall sections 23, 25 or, alternatively, with the back wall 22 and left and right side walls 24, 26 (see also FIG. 3B) without requiring modification of the trailer construction.

Figure 6:
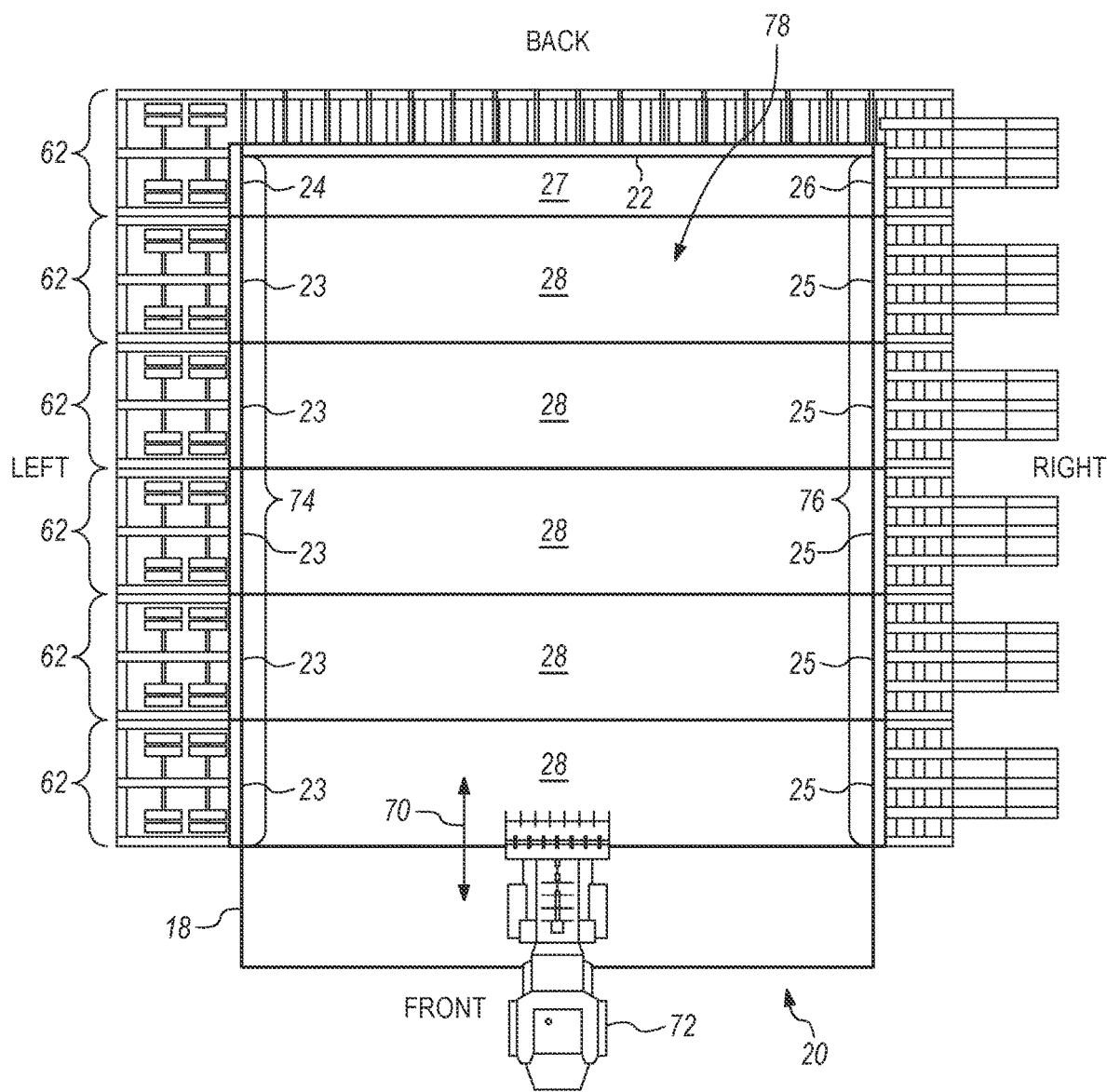
FIG. 6 is a plan view of the storage bay formed by six trailers and a ramp secured in alignment with an open passageway into the storage bay where a particulate material may be stored.

FIG. 6 is a plan view of the storage bay 20 formed by six trailers 62 secured together, one trailer secured to the next trailer, in a side-by-side configuration and a ramp 18 secured in alignment with an open passageway 70 into the storage bay where a particulate material may be stored. The back wall 22 is provided by the first trailer 62 (at the top in the Figure), as well as the left and right wall sections 24, 26. The second through sixth trailers 62 provide left and right wall sections 23, 25. Collectively, the left wall section 24 and the five left wall sections 23 form a contiguous left wall 74. Collectively, the right wall section 26 and the five right wall sections 25 form a contiguous right wall 76. Similarly, the floor section 27 and the five floor sections 28 form a contiguous rectangular floor 78, which includes the floor area between the contiguous left wall 74, the back wall 22, and the contiguous right wall 76. The open passageway 70 allows ingress and egress to heavy equipment, such as the front loader 72, for the delivery and withdrawal of particulate material stored in the storage bay 20. As shown, the open passageway 70 along the front of the storage bay 20 may extend across one full side of the contiguous rectangular floor that spans between the contiguous left wall 74 and the contiguous right wall 76. A particulate material may be piled or mounded up within the storage bay 20 with the font loader 72 having full access to any or all of the particulate material.

It should be understood that the pile of particulate material may cover any or all of the contiguous rectangular floor 78 and may be piled against the walls 74, 22, 76 up to the full height of the walls. Furthermore, the particulate material may be piled above the height of the walls in the central portions of the contiguous rectangular floor 78 according to the natural angle of repose exhibited by the particulate material.

Figure 7A:
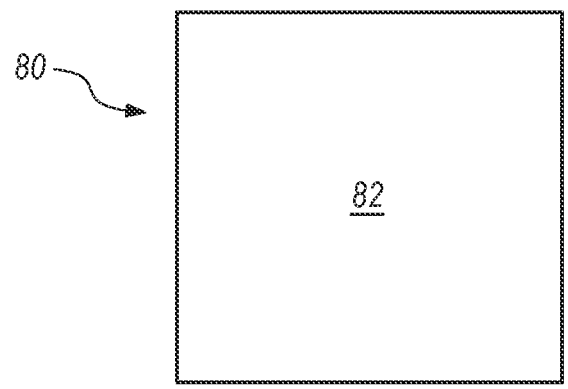
FIGS. 7A-B are diagrams of a front surface of a wall section and a back surface of a wall section showing the wall framework and a brace that is securable to the wall framework.
Figure 7B:
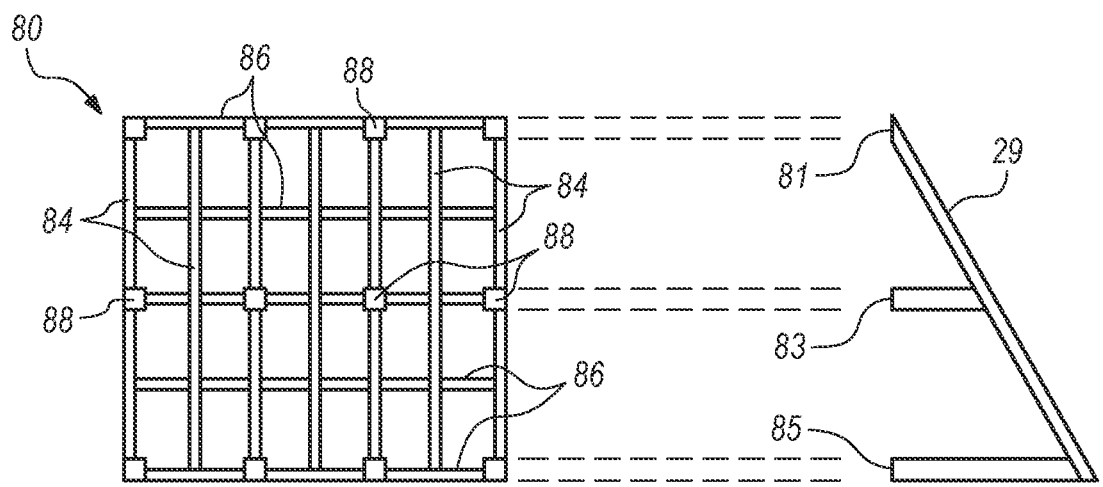

FIGS. 7A-B are diagrams of a front surface 82 of a wall section 80 (FIG. 7A) and a back side of the wall section 80 showing the wall framework and a brace 29 that is securable to the wall framework (FIG. 7B). The front surface 82 may be formed by plate steel. The framework may be secured to the back surface of the plate steel. A preferred framework may have a plurality of vertical members 84 (7 shown) and a plurality of horizontal members 86 (5 shown), which may also be made with steel. The framework may then secure an array of mounting plates 88 (12 shown), perhaps secured at the intersections of the vertical and horizontal members 84, 86. The mounting plates 88 are positioned on the framework at various elevations to secure points 81, 83, 85 of the brace 29. The 12 mounting plates 88 shown are configured in 4 columns of mounting plates to secure up to 4 of the braces 29. The wall sections 22-26 (see FIG. 1A) may vary in width, but the construction of these wall sections may be similar to the wall section 80. Specifically, the spacings of the vertical and horizontal members 84, 86 may be the same or somewhat different, but a longer wall section will generally include additional vertical members 84 and a shorter wall section will generally include fewer vertical members 84. For example, the wall section 80 may be representative of a left and/or right wall section 23, 25. The wall sections 24, 26 may be roughly half as wide as wall sections 23, 25 and include roughly half as many vertical members, whereas the back wall 22 may be as wide as the sum of the widths of the 6 left wall sections 23, 24 and include a correspondingly greater number of vertical members.

Figure 8A:
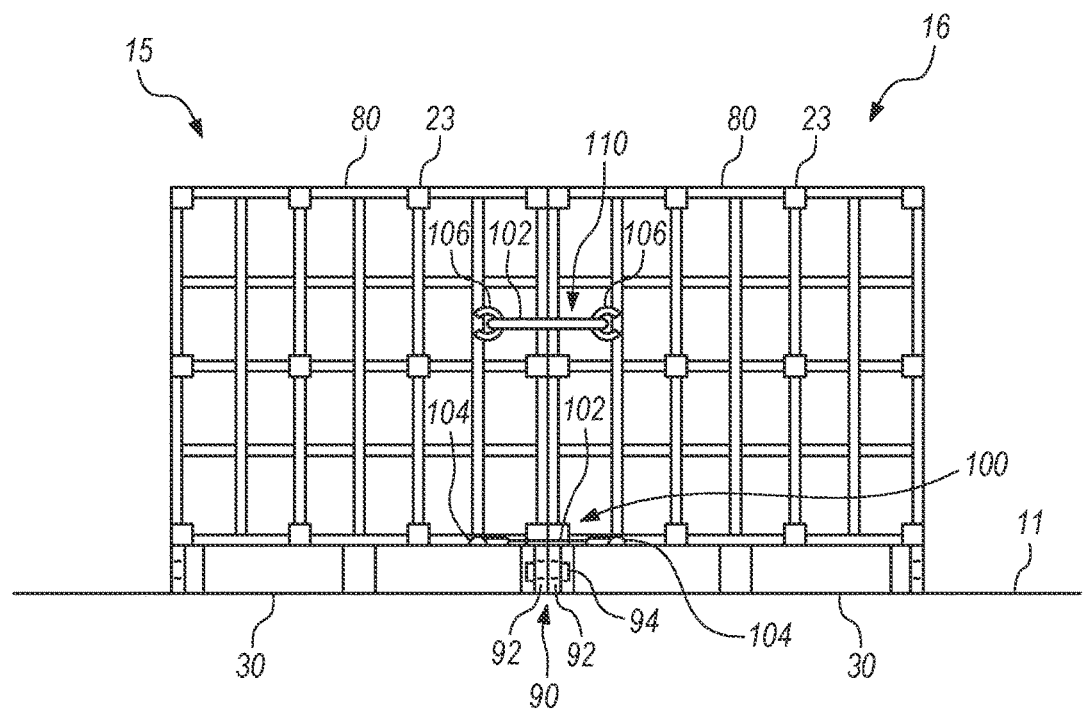
Figure 8B:
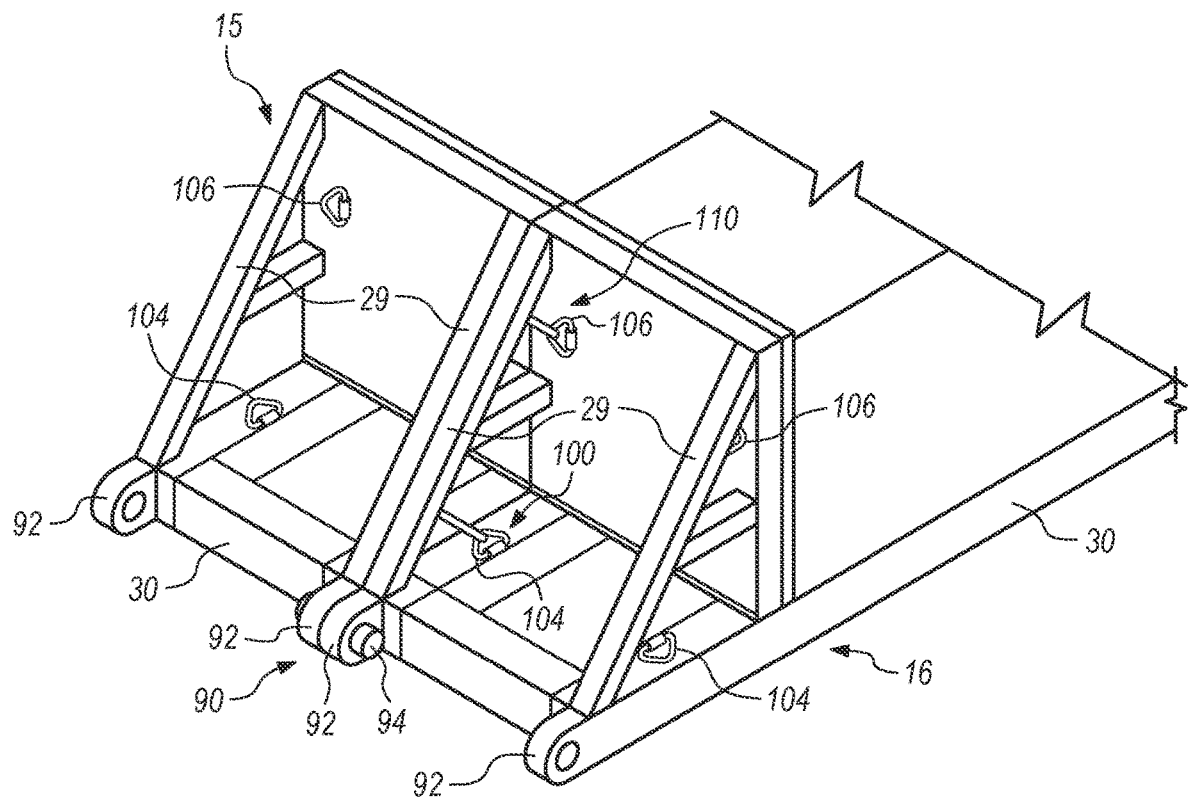

FIG. 8A is a diagram of two portable skids, such as the skids 15, 16 of FIG. 1A, being secured together in a side-by-side configuration. The walls 23 of skids 15, 16 may have the same construction as the wall section 80. Furthermore, the walls 23 extend upward from the rectangular base 30 (see FIGS. 2A-C) or 40 (see FIGS. 3A-C). A pair of example braces 29 are shown in FIG. 8B, but are not shown in FIG. 8A in order to better illustrate connections between the skids 15, 16.

A first connection 90 is formed between the adjacent rectangular bases 30, which each include a mounting lug 92. By positioning the adjacent rectangular bases 30 in contact with each other on a flat or level surface, such as the load bearing surface 11, a hole through each mounting lug 92 may be axially aligned. A shaft or pin 94, such as a 4 inch diameter metal shaft, may be inserted therethrough. Accordingly, the shaft and the mounting lugs cooperate to prevent either of the adjacent rectangular bases 30 from shifting vertically up or down or sliding longitudinally (in an out of the plane of FIG. 8A) relative to the other rectangular base 30.

In order to prevent the rectangular bases 30 sliding apart (left or right in FIG. 8A), a second connection 100 may be provided. The second connection 100 may include a ratcheting chain binder 102 extending between a first ring 104 secured to the first rectangular base 30 and a second ring 104 secured to the second rectangular base 30. This connection is shown in greater detail in reference to FIG. 8C.

Furthermore, the two wall sections 23 of the adjacent skids 15, 16 may also be secured together. Similar to the second connection 100, a third connection 110 may be formed by another ratcheting chain binder 102 extending between a first ring 106 secured to the first wall section 23 and a second ring 106 secured to the adjacent second wall section 23. The third connection is formed between different components and locations, but the formation of the connections may be identical as shown in greater detail in reference to FIG. 8C.

FIG. 8B is a perspective view of the partial assembly of FIG. 8A, which shows the two adjacent skids 15, 16 secured together. The position and configuration of the mounting lugs 92 is more clearly shown. Also note that each skid 15, 16 includes a second mounting lug 92 that is available for forming a connection with further adjacent skids on the opposing sides thereof. A similar pair of mounting lugs may be formed on the opposite end of each skid, so that both ends of the skid are prevented from shifting vertically or horizontally (end to end). The second and third connections 100, 110 are responsible for preventing the skids 15, 16 from shifting apart (side to side). Each skid 15, 16 further includes additional rings 104, 106 that are available for forming second and third connections with further adjacent skids on the opposing sides thereof.

Figure 8C:
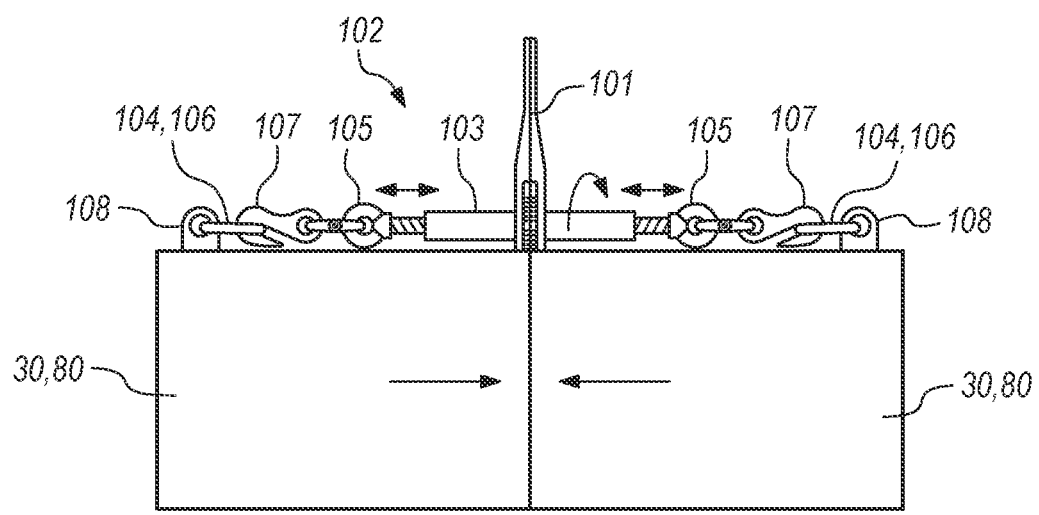

FIG. 8C is a diagram of a connection that is representative of either a second connection 100 or a third connection 110 between two adjacent skids 15, 16. The rings 104, 106 may be D-shaped rings that is secured by welding an anchor 108 to the rectangular bases 30 or the wall sections 80 that are to be secured together. The ratcheting chain binder 102 may have a ratcheting handle 101 that turns an element 103 with two sets of internal threads. Turning the element 103 in a first direction will retract the threaded eye-bolts 105 and turning the element in a second direction will extent the threaded eye-bolts 105. A pair of hooks 107 may engage the respective two rings 104, 106, where the hooks are connected to the eye bolts 105 with or without a chain therebetween.

FIGS. 9A-B are perspective views a representative wall section 120 having a pair of hinged panels 122, 124 in a stowed condition (FIG. 9A) and a deployed condition (FIG. 9B), respectively. In FIG. 9A, the panels 122, 124 swung inward toward each other and do not extend beyond the side edges of the wall section 120. This stowed condition is useful for transportation of a skid that includes the wall section 120. Note that the hinges of the left panel 122 offset from the wall surface 82 by shims 123 so that the left panel 122 may lay flush over the right panel 124.

In FIG. 9B, the panels 122, 124 are swung outward away from each other to extend beyond the side edges of the wall section 120. In particular, the left panel 122 may extend in a leftward direction to overlap with another wall section 120 of an adjacent skid and the right panel 124 may extend in a rightward direction to overlap with another wall section 120 of an adjacent skid. Accordingly, the panels 122, 124 may be deployed to span across any gap that might exist between wall section 120 and any adjacent wall section 120. Optionally, the adjacent walls sections 120 may have their own hinged panels 122, 124, in which case the left panels 122 that are shimmed should be positioned in front of the right panels 124 that are not shimmed.

Still further, the wall sections 120 include a non-limiting example of a latch mechanism. The latch mechanism includes a slot 130 through each panel 122, 124, a slotted pin member 132 secured to the wall surface 82 in a positioned to align with the slot 130 in one of the panels when the panel is deployed, and a wedge-shaped retaining pin 134 that is pushed into the slotted pin member 132 to keep the panels in the deployed condition.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises", "comprising", "includes" and/or "has," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of some embodiments.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A modular particulate storage system, comprising:
a plurality of portable skids, wherein each skid includes an elongate rectangular base supporting a floor section and a wall section extending upward from the floor section, wherein the plurality of portable skids are securable together in a side-by-side configuration to form a storage bay having a contiguous rectangular floor that combines the floor sections of the plurality of portable skids and a contiguous wall that combines the walls sections of the plurality of portable skids and extends along three sides of the contiguous rectangular floor, and wherein one side of the contiguous rectangular floor includes an open passageway into the storage bay.

2. The system of claim 1, wherein the open passageway allows equipment to access particulate material stored within the storage bay.

3. The system of claim 1, the system further comprising:
an equipment ramp securable to one of the portable skids to slope from a load bearing surface up to the rectangular floor and align with the open passageway.

4. The system of claim 1, wherein the plurality of portable skids includes:
one portable skid with a longitudinal wall section that will form a back wall of the storage bay; and
a plurality of portable skids each having a first wall section that will form a part of a left side wall of the storage bay and a second wall section that will form a part of a right side wall of the storage bay.

5. The system of claim 1, wherein a particulate storage capacity of the storage bay is expandable by adding another portable skid having the first and second wall sections.

6. The system of claim 1, further comprising:
a plurality of wall braces supporting each wall section, wherein each wall section is formed by a rigid panel and a rigid wall framework secured to an outwardly directed side of the rigid panel, and wherein each wall brace is connected to the rectangular base and the rigid wall framework.

7. The system of claim 1, wherein each portable skid includes a front mounting lug for facing an adjacent portable skid and a back mounting lug for facing the adjacent portable skid, wherein each mounting lug includes a laterally directed hole therein, the system further comprising:
a shaft that is extendable through the hole in the front mounting lug of a first skid and also through the hole in the front mounting lug of a second skid that is positioned adjacent the first skid, wherein the shaft keeps the floor section of the first skid at the same elevation as the floor section of the second skid.

8. The system of claim 1, further comprising:
a plurality of ratcheting chain binders, wherein each ratcheting chain binder has a first end securable to a first ring on the rectangular base of a first portable skid and a second end securable to a second ring on the rectangular base of a second portable skid that is adjacent to the first portable skid, wherein the ratcheting chain binder may be tightened to prevent lateral separation of the rectangular bases of the first and second portable skids.

9. The system of claim 1, further comprising:
a plurality of ratcheting chain binders, wherein each ratcheting chain binder has a first end securable to a first ring attached to a wall section of a first portable skid and a second end securable to a second ring attached to a wall section of a second portable skid that is adjacent to the first portable skid, wherein the ratcheting chain binder may be tightened to prevent lateral separation of the wall sections of the first and second portable skids.

10. The system of claim 1, wherein each wall section includes a hinged panel mounted on an inside surface of the wall section, wherein the hinged panel may be placed in a stowed condition for transportation and placed in a deployed condition for containing particulate material in the storage bay, and wherein the hinged panel extends beyond an edge of the wall section in the deployed condition but not in the stowed condition.

11. The system of claim 1, wherein each portable skid has opposing lateral side edges that are substantially linear and parallel and define a maximum lateral width of the portable skid.

12. The system of claim 1, wherein the wall sections have a height between 4 and 12 feet.

13. The system of claim 1, wherein the storage bay is configured to contain the particulate material above the load bearing surface and prevent the particulate material in the storage bay from contacting the load bearing surface.

14. The system of claim 1, wherein each portable skid is formed into a trailer having a first end with a set of wheels, a second end having a trailer coupler, and a central portion between the first and second ends that forms one of the floor sections of the contiguous rectangular floor.

15. The system of claim 14, wherein each trailer is a winch trailer having a trailer frame designed to be set on the ground.

16. A method, comprising:
positioning a plurality of portable skids in a side-by-side configuration, wherein each portable skid includes an elongate rectangular base supporting a floor section and a wall section extending upward from the floor section; and
securing, for each of the portable skids, the portable skid to one or more of the portable skids that are immediately adjacent to the portable skid to form a storage bay, wherein the storage bay has a contiguous rectangular floor that combines the floor sections of the plurality of portable skids and a contiguous wall that combines the wall sections of the plurality portable skids and extends along three sides of the contiguous rectangular floor, and wherein one side of the rectangular floor includes an open passageway into the storage bay.

17. The method of claim 16, wherein each portable skid forms a trailer having a first end with a set of wheels, a second end having a trailer coupler, and a central portion between the first and second ends that forms one of the floor sections of the contiguous rectangular floor, the method further comprising:
lowering each of the trailers to be supported by a load bearing surface in the side-by-side configuration.

18. The method of claim 16, further comprising:
securing an equipment ramp to one of the portable skids, wherein the equipment ramp slopes from a load bearing surface up to the contiguous rectangular floor and aligns with the open passageway.

19. The method of claim 16, further comprising:
binding, for each of the trailers, the wall section of the trailer to the wall section of one or more of the trailers that are adjacent to the trailer.

20. The method of claim 16, further comprising:
storing a pile of particulate material in the storage bay, wherein the storage bay prevents the particulate material from making contact with a load bearing surface under the plurality of portable skids; and
driving equipment through the open passageway onto the contiguous rectangular floor to scoop up a portion of the particulate material and remove the portion of the particulate material from the pile.

* * * * *